(12) United States Patent
Kishimoto

(10) Patent No.: US 10,701,246 B2
(45) Date of Patent: Jun. 30, 2020

(54) IMAGE PROCESSING APPARATUS FOR GENERATING AN IMAGE BASED ON CAPTURING IMAGES OF A MATERIAL AND AN IMAGE PROCESSING APPARATUS THAT GENERATES COLOR DATA OF A MATERIAL ON A BACKGROUND

(71) Applicant: FUJI XEROX CO., LTD., Tokyo (JP)

(72) Inventor: Yasunari Kishimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/692,873

(22) Filed: Aug. 31, 2017

(65) Prior Publication Data
US 2018/0241908 A1 Aug. 23, 2018

(30) Foreign Application Priority Data

Feb. 21, 2017 (JP) .................. 2017-029657

(51) Int. Cl.
*H04N 1/40* (2006.01)
*H04N 1/60* (2006.01)
*H04N 1/407* (2006.01)

(52) U.S. Cl.
CPC .......... *H04N 1/6086* (2013.01); *H04N 1/407* (2013.01); *H04N 1/6094* (2013.01); *H04N 1/6097* (2013.01); *H04N 1/6013* (2013.01)

(58) Field of Classification Search
None
See application file for complete search history.

(56) References Cited

U.S. PATENT DOCUMENTS

| 6,377,269 | B1* | 4/2002 | Kay | G06T 11/60 345/589 |
| 7,176,944 | B2* | 2/2007 | Browne | G06T 11/001 345/629 |
| 8,243,333 | B2* | 8/2012 | Tamura | H04N 1/4095 358/2.1 |
| 2008/0007801 | A1* | 1/2008 | Yotsuyanagi | H04N 1/00681 358/500 |
| 2008/0204820 | A1* | 8/2008 | Ito | H04N 1/4076 358/461 |
| 2010/0153234 | A1* | 6/2010 | Goodson | G06Q 30/02 705/26.1 |
| 2014/0125659 | A1* | 5/2014 | Yoshida | G06T 15/506 345/419 |

FOREIGN PATENT DOCUMENTS

| JP | H10-257518 A | 9/1998 |
| JP | 2008-154175 A | 7/2008 |
| JP | 2008-252381 A | 10/2008 |

* cited by examiner

*Primary Examiner* — Barbara D Reinier
(74) *Attorney, Agent, or Firm* — Oliff PLC

(57) ABSTRACT

An image processing apparatus includes an acquisition unit and a first generation unit. The acquisition unit acquires plural images of a single material with different backgrounds. The first generation unit generates an image of the single material without a background color by using the plural images.

9 Claims, 10 Drawing Sheets

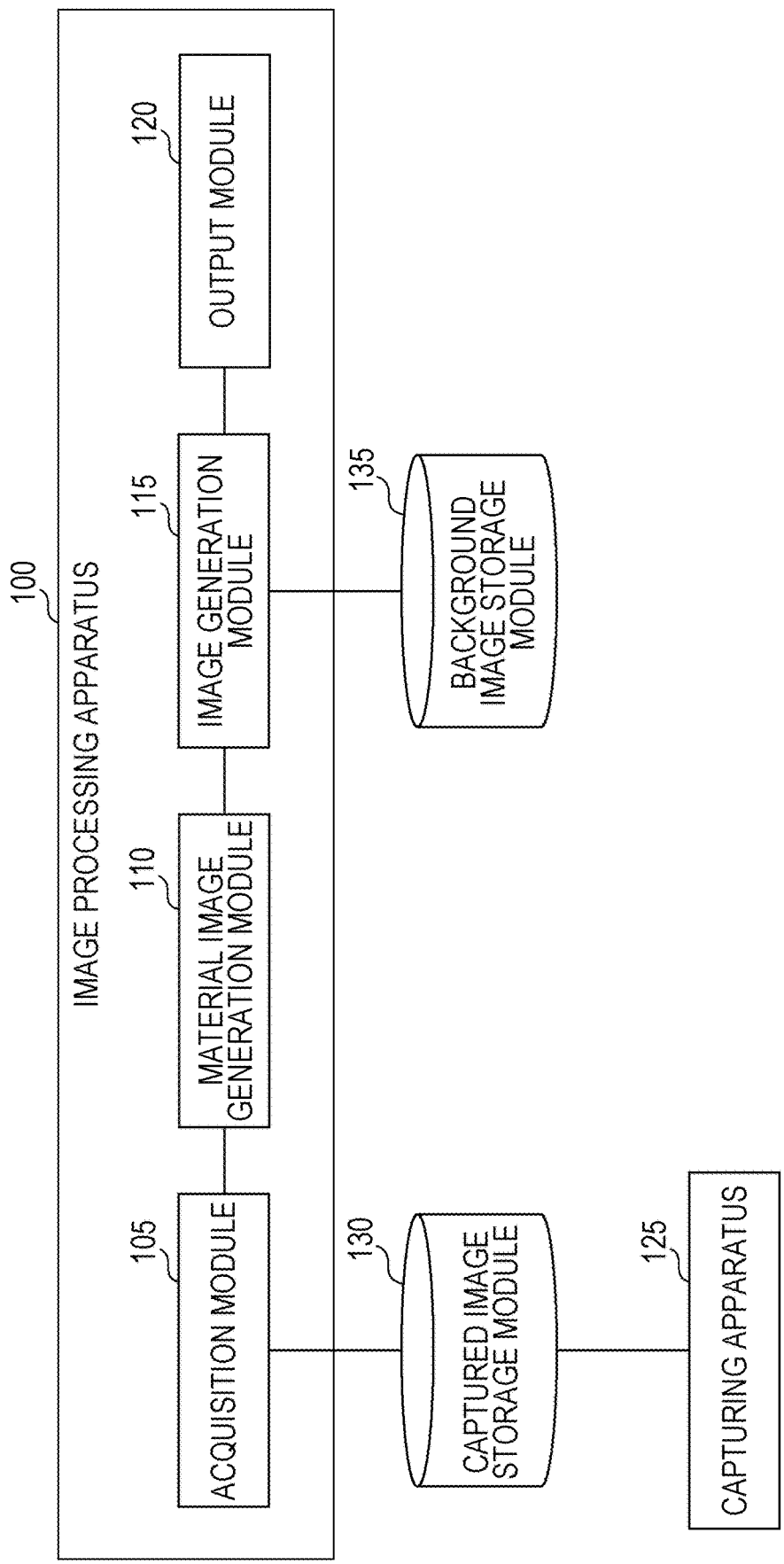

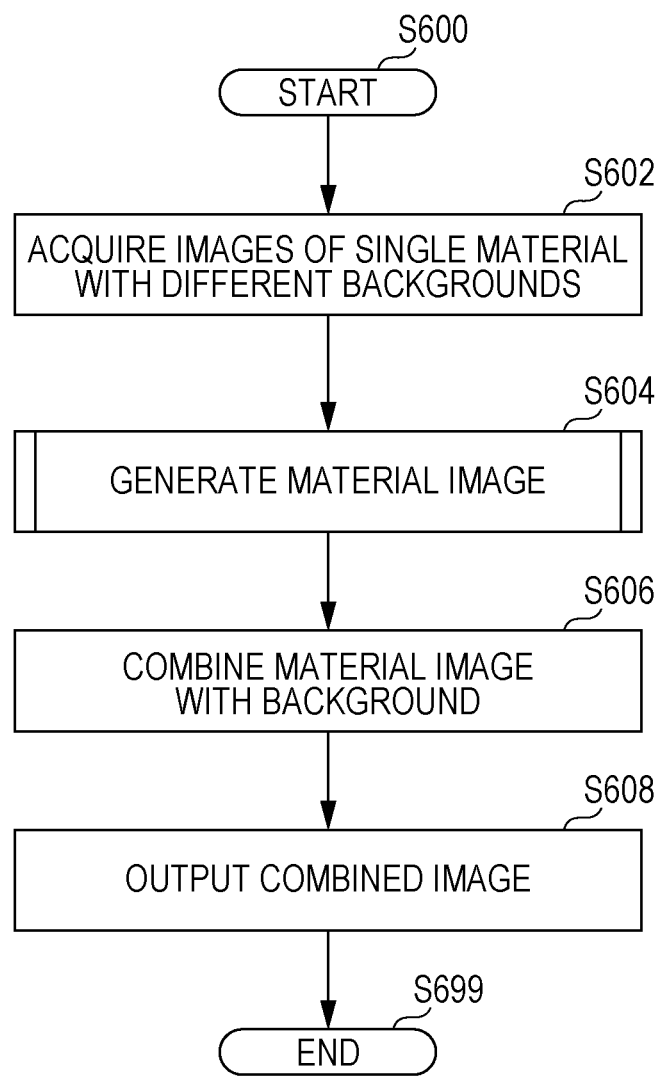

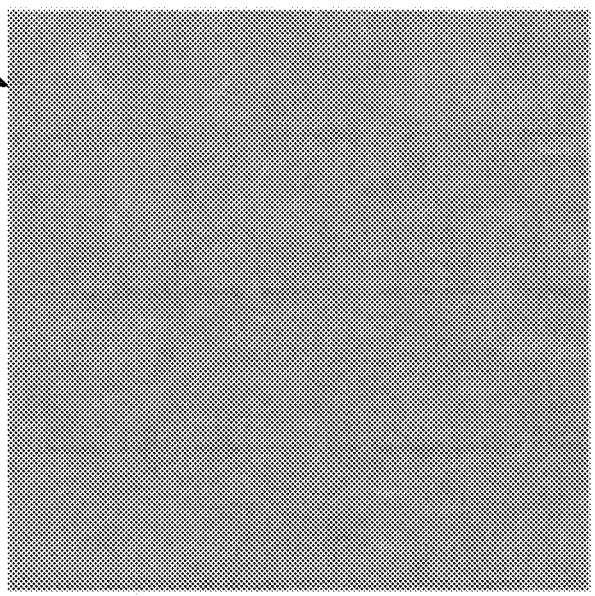
FIG. 7C
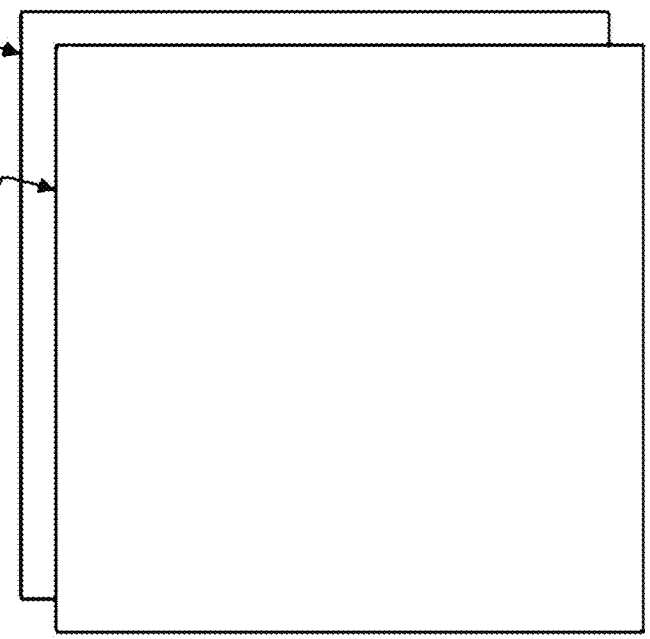
FIG. 7B
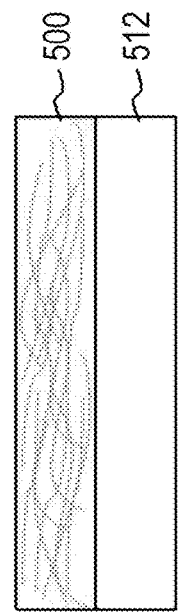
FIG. 7A2
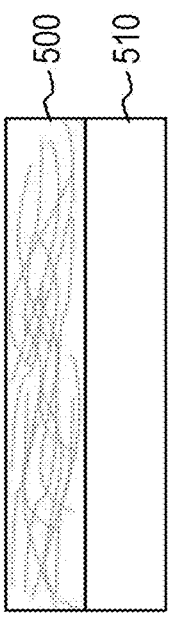
FIG. 7A1

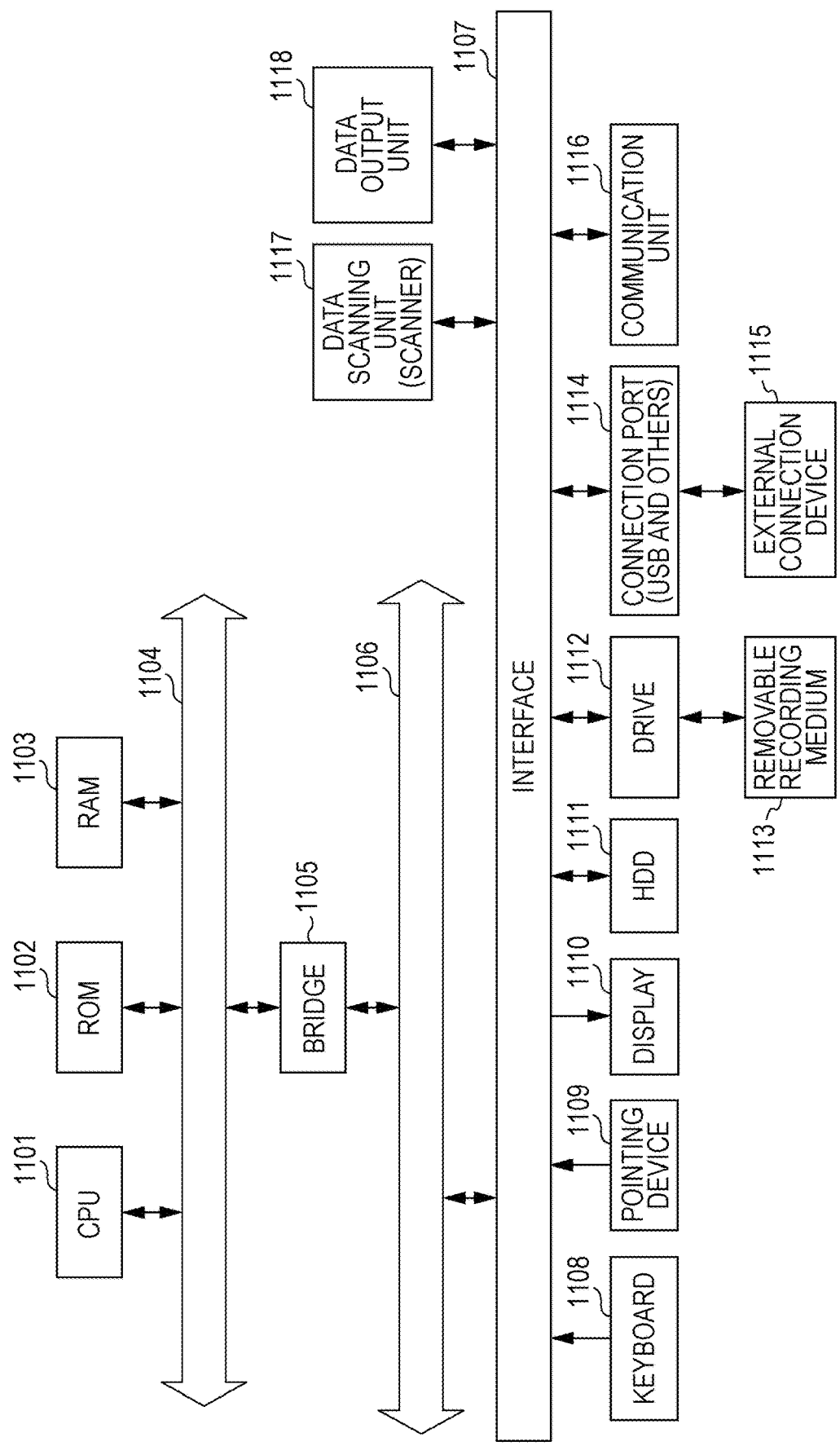

IMAGE PROCESSING APPARATUS FOR GENERATING AN IMAGE BASED ON CAPTURING IMAGES OF A MATERIAL AND AN IMAGE PROCESSING APPARATUS THAT GENERATES COLOR DATA OF A MATERIAL ON A BACKGROUND

CROSS-REFERENCE TO RELATED APPLICATIONS

This application is based on and claims priority under 35 USC 119 from Japanese Patent Application No. 2017-029657 filed Feb. 21, 2017.

BACKGROUND

(i) Technical Field

The present invention relates to an image processing apparatus.

(ii) Related Art

In the case where an image of a document or the like is captured, the captured image is constituted by three elements: content (contained content) such as text contained in the document or the like, a material such as a sheet having the content thereon, and a background (backing) of the material, specifically. There is an influence of the background when an image is captured. In addition, in the case where content is generated, it is desired to (digitally) generate, on a screen, a (preview) image of the content on a material actually used. Thus, acquisition of an image of the material alone is desired.

SUMMARY

According to an aspect of the invention, there is provided an image processing apparatus including an acquisition unit and a first generation unit. The acquisition unit acquires plural images of a single material with different backgrounds. The first generation unit generates an image of the single material without a background color by using the plural images.

BRIEF DESCRIPTION OF THE DRAWINGS

Exemplary embodiments of the present invention will be described in detail based on the following figures, wherein:

FIG. 1 illustrates an example of a conceptual module configuration according to a first exemplary embodiment;

FIG. 6 is a flowchart illustrating an example of a process according to the first exemplary embodiment;

FIGS. 7A1, 7A2, 7B, and 7C illustrate an example of a process according to the first exemplary embodiment;

FIG. 11 is a block diagram illustrating an example of a hardware configuration of a computer that implements the first and second exemplary embodiments.

DETAILED DESCRIPTION

Figure 2A:
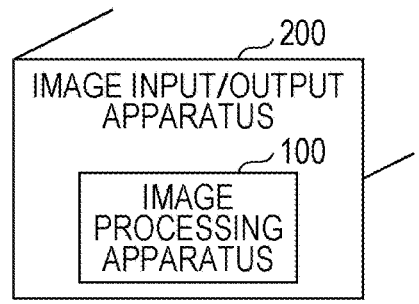
FIGS. 2A and 2B each illustrate an example of a system configuration that employs the first exemplary embodiment.

Exemplary embodiments for implementing the present invention will be described below with reference to the accompanying drawings.

First Exemplary Embodiment

FIG. 1 illustrates an example of a conceptual module configuration according to a first exemplary embodiment.

In general, the term "module" refers to a logically separable component, such as a software component (a computer program) or a hardware component. Thus, the term "module" used in this exemplary embodiment indicates not only a module in a computer program but also a module in a hardware configuration. For this reason, the exemplary embodiment includes descriptions regarding a computer program causing a computer to function as the modules (such as a program causing a computer to execute each procedure, a program causing a computer to function as each unit, or a program causing a computer to implement each function), a system, and a method. For ease of explanation, the expressions "to store" and "to cause a device to store" and expressions equivalent thereto are used. When the exemplary embodiment is implemented as a computer program, these expressions indicate that the computer program causes a storage device to store information or the computer program performs control to cause a storage device to store information. Also, modules and functions may have a one-to-one correspondence; however in implementations, one module may be constituted by one program, plural modules may be constituted by one program, or conversely one module may be constituted by plural programs. In addition, plural modules may be executed by one computer or one module may be executed by plural computers in a distributed or parallel environment. Moreover, one module may include another module. Hereinafter, the term "connection" is used to refer to physical connection and logical connection (such as data exchange or reference relations between instructions and between pieces of data). Further, the term "predetermined" indicates a state where something is determined prior to target processing. The term "predetermined" includes the meaning that something is determined in accordance with a state/status at that time or a state/status up to that point before and even after processing according to the exemplary embodiment starts as long as the determination is made prior to the target processing. In the case where plural "predetermined values" are used, the plural "predetermined values" may be different from each other or two or more values (which obviously include all values) may be the same. Moreover, the expression "if something is A, B is performed" is used to indicate that "it is determined whether or not something is A, and then B is performed if it is determined that something is A", except for the case where determination regarding whether or not something is A is not needed.

In addition, a system or an apparatus may be constituted by plural computers, plural hardware components, plural devices, or the like that are connected to each other via a communication medium, such as a network (including a one-to-one communication connection), or may be constituted by one computer, one hardware component, one device, or the like. The terms "apparatus" and "system" are used as synonyms to each other. Obviously, the "system" does not include a social "mechanism" (social system) that is an arrangement made by people.

In each process performed by each module or in each of plural processes performed by each module, information is read from a storage device, the process is performed on the information, and the processing result is written to the storage device. Thus, a description regarding reading information from the storage device performed prior to the process and writing information to the storage device subsequent to the process is omitted in some cases. Here, examples of the storage device may include a hard disk drive (HDD), a random access memory (RAM), an external storage medium, a storage device connected via a communication network, and registers included in a central processing unit (CPU).

An image processing apparatus 100 according to the first exemplary embodiment generates an image of a material. As illustrated in FIG. 1, the image processing apparatus 100 includes an acquisition module 105, a material image generation module 110, an image generation module 115, and an output module 120. The image processing apparatus 100 generates background-removed material image data by using images obtained by capturing a single material multiple times while changing the background.

Figure 3:
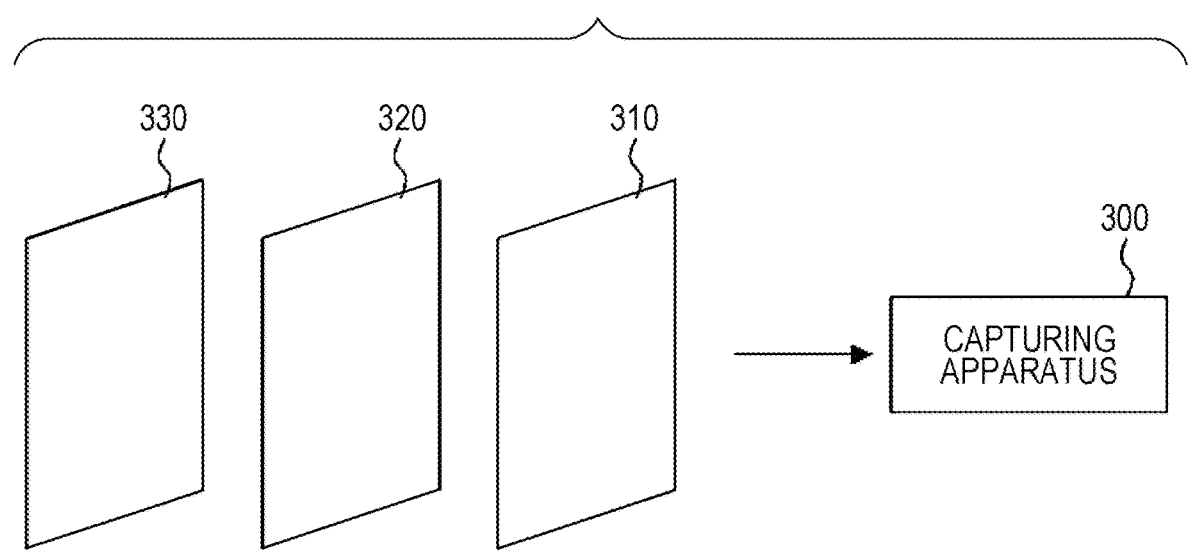
FIG. 3 illustrates an example of targets subjected to capturing.

FIG. 3 illustrates an example of targets subjected to capturing. In the case where a capturing apparatus 300 (which may correspond to a capturing apparatus 125) performs capturing as illustrated in the example in FIG. 3, a content image 310, a material image 320, and a background image 330 serve as the targets. The term "to capture" refers to reading an image. Electronic data is generated as a result of capturing. For example, in the case where a document or the like is subjected to capturing, the content image 310 corresponds to content (contained content) such as text contained in the document or the like, the material image 320 corresponds to a material such as a sheet having the content thereon, and the background image 330 corresponds to a background (backing) of the material. That is, when the content image 310 is captured, the content image 310 is affected not only by the material image 320 but also by the background image 330. In the case where a scanner of a copier is used, processing such as "background suppression" or "back-side show-through control" is performed. As a result of such processing, the material image, which is to be acquired, is removed together with the background.

The term "content" may refer to not only text (including printed text and handwritten text) but also a drawing, an image, etc.

The term "material" refers to a target that is captured with a scanner or the like. If the target is a printed matter, the "material" is a medium (usually, paper or the like) subjected to printing. If the target is a pattern on a transparent sheet, the "material" is the transparent sheet. The "material" refers to, for example, a member or material, such as wood, wallpaper, or fabric.

The term "background" refers to a backing of the material. For example, in the case where the material is thin paper, the background behind the paper shows through the paper. Thus, when a person sees content, the person sees the content on the material with the backing, instead of seeing the content alone.

For example, in the case where content is printed by using a printer, a person sees a combination of three elements, i.e., the content, the material (paper in this case), and the background (which may be a stack of plural materials (pieces of paper) in the case of a multiple-page printed matter). The background differs depending on the viewing situation (state). In the case where content is seen using a display device such as a liquid crystal display of a computer, the content alone is digitized. Thus, the material without a backing is not acquirable through capturing for digitization. For this reason, the impression of the content seen on the liquid crystal display sometimes differs from the impression of an actual printed matter (the combination of three elements of the content, the material, and the background).

Referring back to FIG. 1, the capturing apparatus 125 is connected to a captured image storage module 130. The capturing apparatus 125 captures images of a single material with different backgrounds. For example, the expression "to capture images" refers to, for example, capturing images using a scanner, a camera, or the like; receiving images from an external device via a communication line by fax or the like; and reading images stored in a hard disk (including one connected via a network as well as one included in a computer).

The captured image storage module 130 is connected to the acquisition module 105 of the image processing apparatus 100 and the capturing apparatus 125. The captured image storage module 130 stores images captured by the capturing apparatus 125 (images of a single material with different backgrounds) and supplies the images to the acquisition module 105.

The acquisition module 105 is connected to the material image generation module 110 and the captured image storage module 130. The acquisition module 105 acquires plural images of a single material with different backgrounds. FIG. 1 illustrates an example in which images are acquired from the captured image storage module 130 as an example of "acquisition". In addition to the above, the acquisition module 105 may capture images using a scanner, a camera, or the like just like the capturing apparatus 125.

In addition, the acquisition module 105 may acquire images with a background having a uniform color. The term "uniform color" refers to a color whose variance is less than or equal to a predetermined threshold.

Further, the acquisition module 105 may acquire images such that the backgrounds include a bright backing or a dark backing. Here, the "bright backing" may indicate a CIE L*(D50) lightness of X or greater, for example. For example, the value of X may be 80 or 90. In addition, the "dark backing" may indicate a CIE L*(D50) lightness of Y or less, for example. For example, the value of Y may be 20 or 25.

The material image generation module 110 is connected to the acquisition module 105 and the image generation module 115. The material image generation module 110 generates an image of a material without a background color by using the plural images acquired by the acquisition module 105. Specifically, the material image generation module 110 generates color conversion coefficients that associate colors of plural different backgrounds (backings) with corresponding colors of a single material on the respective backgrounds. The material image generation module 110 generates a material image by using the color conversion coefficients.

A background image storage module 135 is connected to the image generation module 115 of the image processing apparatus 100. The background image storage module 135 stores background image data.

The image generation module 115 is connected to the material image generation module 110, the output module 120, and the background image storage module 135. The image generation module 115 generates an image in which the material image generated by the material image generation module 110 is combined with a given background image. That is, when the material image is displayed on a display device, the image generation module 115 allows the material image to be displayed in combination with an image of a background actually used. An image stored in the background image storage module 135 may be used as the given background image.

In addition, the image generation module 115 may use, as the given background image, an image having a background color but not containing a background or an image having a background color close to black. In the case of the "image having a background color but not containing a background", the captured image is an image of the material or is similar to the image of the material. Specifically, the "image having a background color but not containing a background" corresponds to an image obtained by capturing an image of the material illuminated from behind. Strictly speaking, a show-through image differs from a reflection image. However, the above case indicates the case where the show-through image is converted into the reflection image by approximating the show-through image to the reflection image by color processing. The image generation module 115 uses one of an "image having a background color but not containing a background" and an "image having a background color close to black" as the given background image.

In addition, the image generation module 115 may generate an image to be displayed on the display device by using an image having a background color close to white as the given background image.

Further, the image generation module 115 may generate an image containing shading created by a light source in at least one direction.

The output module 120 is connected to the image generation module 115. The output module 120 receives the image generated by the image generation module 115 and outputs the image. The expression "to output an image" refers to, for example, printing the image using a printing apparatus such as a printer, displaying the image on a display device such as a display, transmitting the image using an image transmission apparatus such as a fax, writing an image to an image storage device such as an image database, storing the image on a storage medium such as a memory card, and providing the image to another information processing apparatus.

Figure 2B:
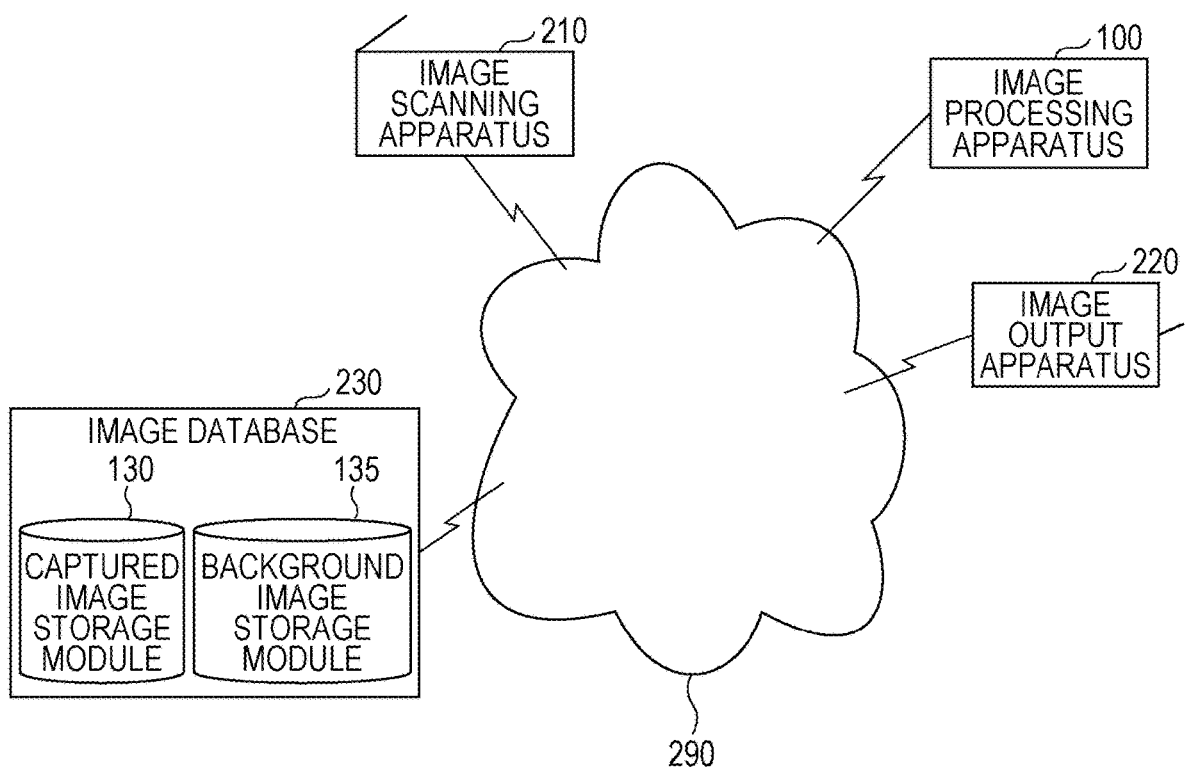

FIGS. 2A and 2B each illustrate an example of a system configuration that employs the first exemplary embodiment.

The example in FIG. 2A illustrates a standalone configuration. An image input/output apparatus 200 includes the image processing apparatus 100. The image input/output apparatus 200 captures images of a single material with different backgrounds. The image processing apparatus 100 then generates a material image from the images, and generates an image in which the material image is combined with a given background image. Then, the image input/output apparatus 200 outputs the image generated by the image processing apparatus 100.

The example in FIG. 2B illustrates a network-based configuration. The image processing apparatus 100, an image scanning apparatus 210, an image output apparatus 220, and an image database 230 are connected to one another via a communication network 290. The communication network 290 may be wired, wireless, or partially wired and partially wireless. For example, the communication network 290 may be the Internet or an intranet serving as communication infrastructure. The image database 230 includes the captured image storage module 130 and the background image storage module 135. In addition, the functions of the image processing apparatus 100 and the image database 230 may be implemented as cloud services. The image processing apparatus 100 acquires images captured by the image scanning apparatus 210 (images of a single material with different backgrounds) or images stored in the captured image storage module 130 of the image database 230, generates a material image from those images, generates an image in which the material image is combined with a given background image, and transmits the generated image to the image output apparatus 220. Then, the image output apparatus 220 outputs the image generated by the image processing apparatus 100. Note that the image output apparatus 220 may be a device such as a personal computer used by the user. In such a case, the image is displayed on a display device, such as a liquid crystal display.

Figure 4:
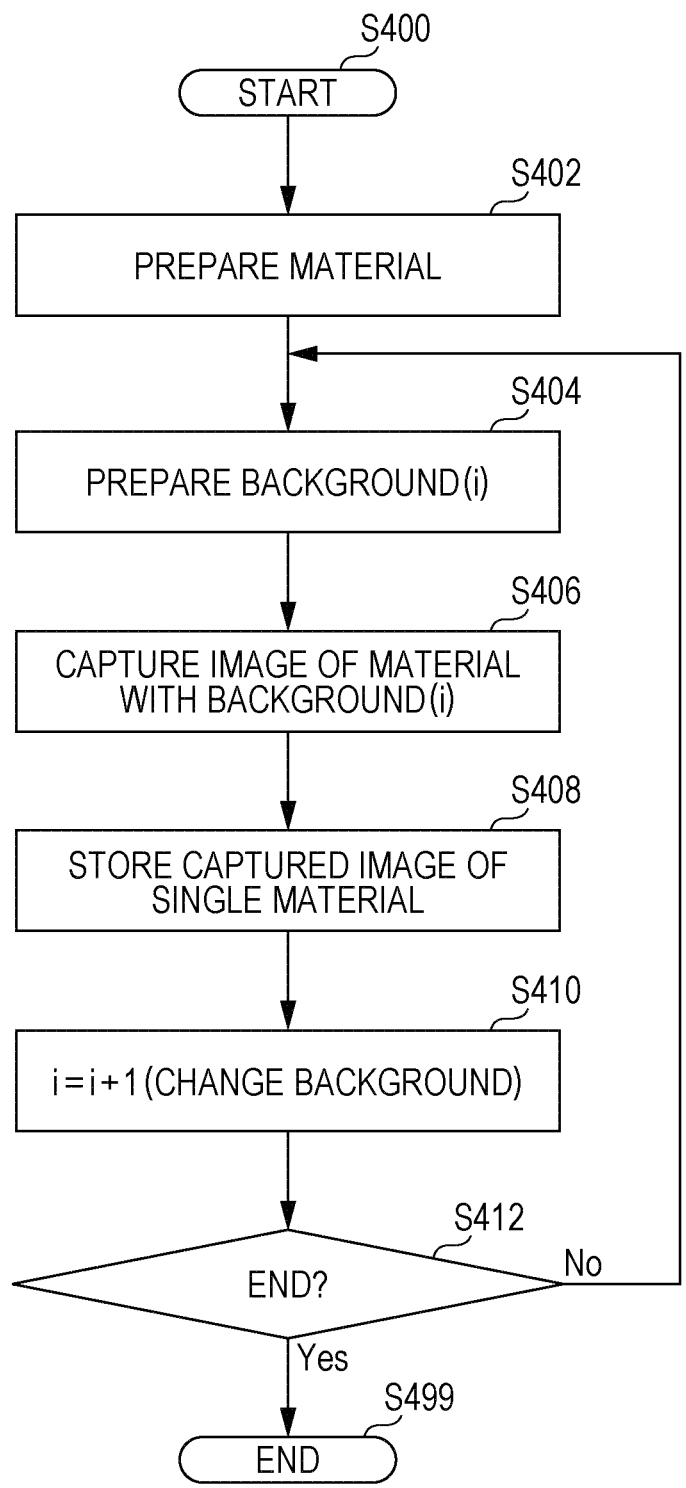
FIG. 4 is a flowchart illustrating an example of a process according to the first exemplary embodiment.

FIG. 4 is a flowchart illustrating an example of a process according to the first exemplary embodiment, specifically, an example of a process of storing images of a single material with different backgrounds in the captured image storage module 130.

The process starts in step S400.

In step S402, an operator prepares a material.

In step S404, the operator prepares a background (i). Here, "i" is a variable, and the background (i) indicates an i-th background. Examples of the background include an image having a background color but not containing a background and an image having a background color close to black. The color close to black may include black and other similar colors, such as gray. For example, the initial value of the variable i is set to 1. In addition, as described above, a background having a uniform color is prepared so that the backgrounds include a bright backing (background) or a dark backing (background).

In step S406, the capturing apparatus 125 captures an image of a material with the background (i). In the case where a background color without a background is selected as the background, the image not containing the background is generated by capturing an image of the material illuminated from behind. In addition, a message that specifies one of the backgrounds may be displayed in accordance with the order (variable i). This configuration enables associations between the background and the captured image. For example, a message indicating that "an image of the material illuminated from behind is captured" may be displayed to the user who performs a capturing operation in the case of the background (1) so as to associate a captured image "i" with the "background color without a background". In addition, a message indicating that "an image of the material is captured using a background color close to black" may be displayed to the user who performs a capturing operation in the case of the background (2) so as to associate a captured image "2" with the "background color close to black".

In step S408, the captured image storage module 130 stores the resultant image as a captured image of the single material.

In step S410, the capturing apparatus 125 increments the variable i by 1 (i=i+1). That is, the capturing apparatus 125 changes the background.

In step S412, the capturing apparatus 125 determines whether to end the process. If the capturing apparatus 125 determines to end the process (Yes in step S412), the capturing apparatus 125 ends the process (step S499); otherwise (No in step S412), the process returns to step S404.

Figure 5B:
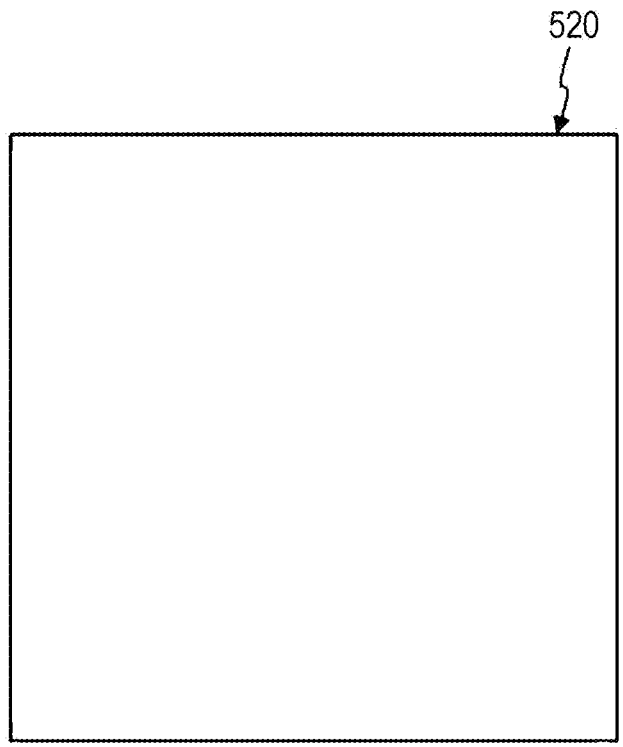
FIGS. 5A and 5B illustrate an example of capturing of an image of a material on a background.
Figure 5A:
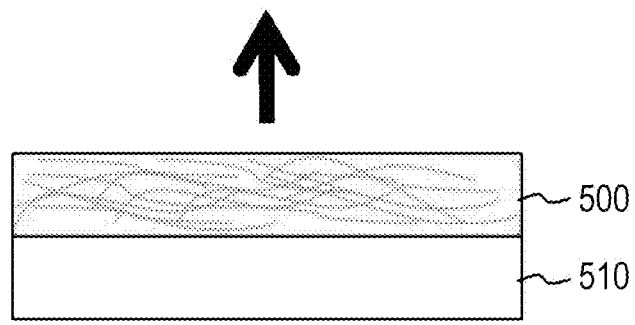

FIGS. 5A and 5B illustrate an example of capturing of an image of a material 500 on a background 510. The user prepares the material 500 and the background 510. The material 500 is a material for which an image is generated. Examples of the material 500 include paper such as Japanese paper, fabric, etc. Examples of the background 510 include a sheet having a color close to black. In the case where the material 500 is illuminated from behind (in the case where no background is included), the background 510 is omitted. The user operates the capturing apparatus 125, and consequently a captured image 520 is generated.

FIG. 6 is a flowchart illustrating an example of a process according to the first exemplary embodiment.

The process starts in step S600.

In step S602, the acquisition module 105 acquires the plural captured images of a single material with different backgrounds.

In step S604, the material image generation module 110 generates a material image. Detailed processing of step S604 will be described later with reference to a configuration illustrated as an example in FIG. 8 and a flowchart illustrated as an example in FIG. 9.

In step S606, the image generation module 115 combines the material image generated in step S604 with a background image stored in the background image storage module 135.

In step S608, the output module 120 outputs the combined image.

The process ends in step S699.

FIG. 7A1 to 7C illustrate an example of the process according to the first exemplary embodiment.

Through the process illustrated in the example in FIG. 4, the captured image 520 of the material 500 and the background 510 and a captured image 522 of the material 500 and a background 512 are acquired. The captured images (the captured images 520 and 522 in FIG. 7B) are acquired for the material 500 with plural backgrounds (the backgrounds 510 and 512 in FIGS. 7A1 and 7A2). The background 510 may be, for example, a dark backing (specifically, a sheet having a color close to black). The background 512 may be, for example, a bright backing (specifically, a sheet having a color close to white).

Then, a material image 700, which is an image of the material 500 alone, is generated.

Figure 8:
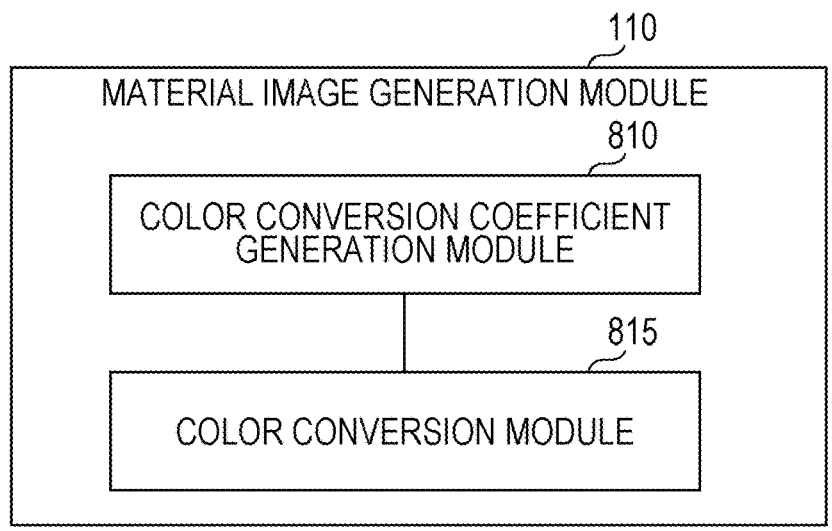
FIG. 8 illustrates an example of a conceptual module configuration of a material image generation module according to the first exemplary embodiment.

FIG. 8 illustrates an example of a conceptual module configuration of the material image generation module 110 according to the first exemplary embodiment.

The material image generation module 110 includes a color conversion coefficient generation module 810 and a color conversion module 815.

The color conversion coefficient generation module 810 is connected to the color conversion module 815. The color conversion coefficient generation module 810 generates color conversion coefficients that represent relationships each between a color of a background and a color of the material on the background.

The color conversion module 815 is connected to the color conversion coefficient generation module 810. The color conversion module 815 applies the color conversion coefficients generated by the color conversion coefficient generation module 810 to pieces of color data constituting the image to generate a material image.

In addition, the color conversion module 815 may apply the color conversion coefficients to statistical data of the image to generate statistical data of pieces of color data of the material on a background. The term "statistical data" refers to a value obtained by performing statistical processing on plural pieces of data. Specifically, examples of the "statistical data" include an average, a mean, and a mode. For example, average color data of the material on a background is generated by applying the color conversion coefficients to the average color data of the image.

Figure 9:
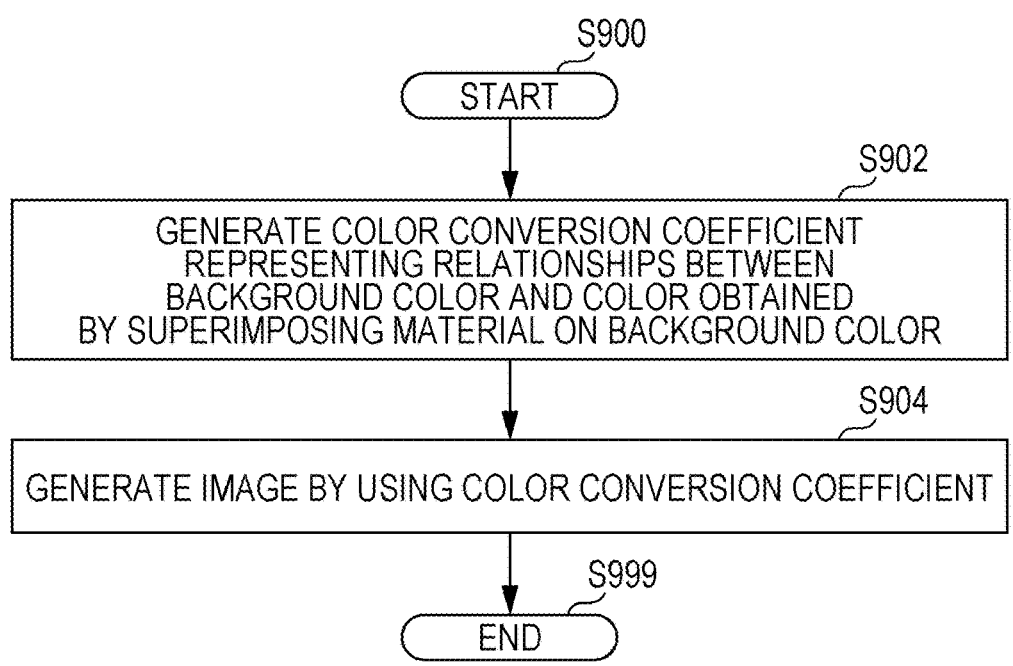
FIG. 9 is a flowchart illustrating an example of a process according to the first exemplary embodiment.

FIG. 9 is a flowchart illustrating an example of a process according to the first exemplary embodiment.

The process starts in step S900.

In step S902, the color conversion coefficient generation module 810 generates color conversion coefficients representing relationships each between a color of a background and a color of the material on the background. The color conversion coefficients may be non-linear coefficients or predetermined values (values prepared as a lookup table). In addition, the color conversion coefficients may be those for two background colors of black and white.

In step S904, the color conversion module 815 generates a material image by using the color conversion coefficients.

The process ends in step S999.

A process of generating a material image without the background color will be described using a specific example. A description will be given of a simple method for generating a material image by using captured images which are generated as a result of performing capturing twice for a single material.

(1) The acquisition module 105 acquires a captured image 1 obtained using a bright background (having a CIE L*(D50) lightness of 90 or greater) and a captured image 2 obtained using a dark background (having a CIE L*(D50) lightness of 25 or less).

(2) Then, the material image generation module 110 generates average color conversion coefficients from the background colors and the average image colors (the background colors are the input and the respective image colors are the output). For example, the background color is known, and a color conversion coefficient for converting the background color into the average image color of the image acquired by the acquisition module 105 is calculated. Since there are plural captured images, the color conversion coefficients are successfully calculated. Specifically, each background color and the corresponding image color may be associated in a format of a lookup table.

(3) Then, the material image generation module 110 generates "material image data" and "display image data" from the captured image 1 and the captured image 2.

(4) Then, the image generation module 115 generates "display material image data" for a given background image by using the material image data and the display image data. In addition, data of glossiness resulting from given illumination may be generated from "material vector image data" and may be added to the target color.

Processing is desirably performed on the material image data by using a computation color space (such as a linear RGB or CIE XYZ color space).

Second Exemplary Embodiment

Figure 10:
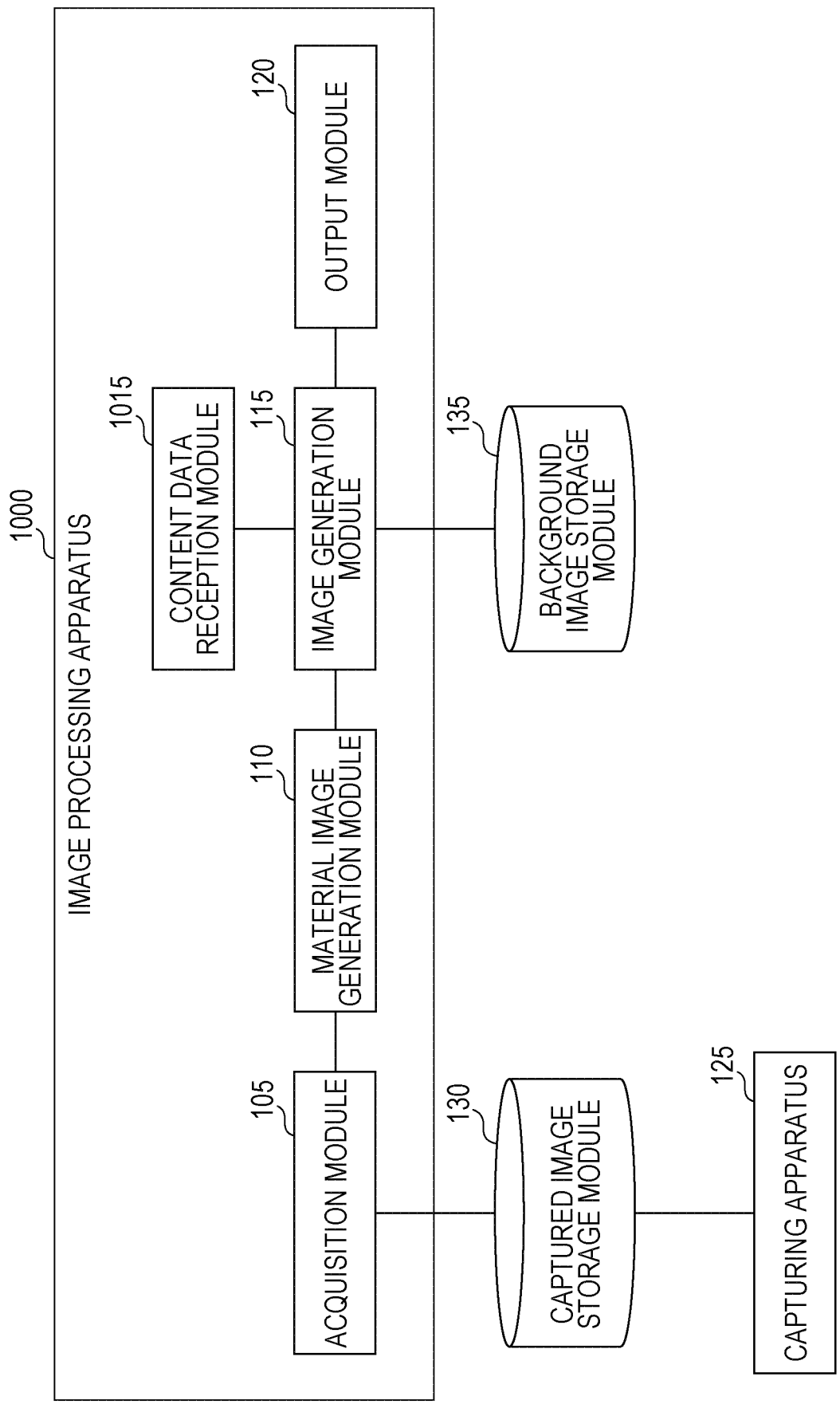
FIG. 10 illustrates an example of a conceptual module configuration according to a second exemplary embodiment.

FIG. 10 illustrates an example of a conceptual module configuration according to a second exemplary embodiment.

An image processing apparatus 1000 integrates content data, material data, and background data together. The image processing apparatus 1000 includes the acquisition module 105, the material image generation module 110, the image generation module 115, the output module 120, and a content data reception module 1015. Note that the same kinds of components as those of the first exemplary embodiment are assigned the same reference signs to omit a duplicated description.

The content data reception module 1015 is connected to the image generation module 115. The content data reception module 1015 receives content data subjected to integration.

The image generation module 115 is connected to the material image generation module 110, the output module 120, the content data reception module 1015, and the background image storage module 135. The image generation module 115 combines (1) data representing content and received by the content data reception module 1015, (2) data representing a material and generated by the material image generation module 110, and (3) data representing a background together and manipulates the color of an image of the content on the material having the background.

In addition, the image generation module 115 may handle a combination of (1-1) data representing content, (1-2) data representing a material, and (1-3) color data representing a background in this order; or in the case there is content on the back side, a combination of (2-1) data representing content on the front side, (2-2) data representing a material of the front side, (2-3) data representing a material of the back side, (2-4) data representing content on the back side, and (2-5) color data representing a background in this order. Here, the pieces of data are combined in accordance with the order based on proximity to eyes.

In addition, a portion around image data constituted by color data obtained through the combination by the image generation module 115 may have a color different from the background color or may have an achromatic color. In addition, on the assumption that the background contains a pattern, the color of the portion may be set to the same color as the background color and the same pattern may be added to the portion. Such a configuration allows a user to check a state of the material placed on the background (such as a state where the background pattern shows through the material).

In addition, color processing in which material data is used may be configured as follows (a process (A) or a process (B)).

(A) The image generation module 115 generates surface vector data only from data representing a material. Examples of the "surface vector data" include data representing glossiness or the like.

The image generation module 115 then integrates surface reflection data, which is obtained by combining the surface vector data and data representing a light source together, with the data representing the color of the material generated in accordance with the background color. Examples of the integration performed here include addition of the surface reflection data and the data representing the color of the material. That is, this case indicates the case where there is no content data and the Bidirectional Reflectance Distribution Function (BRDF) model, which is one of light reflection models, is used only for material data. Specifically, a reflection ratio corresponding to surface reflectance is determined in accordance with an $\alpha$ channel value, and a surface reflection component (XYZ2) is generated using a surface reflection component of the BRDF model (for example, the Phong reflection model or the Cook-Torrance model) including predetermined illumination information. Note that the surface reflection component is generated in the XYZ color space. A value included in the image acquired by the acquisition module 105 is used as the $\alpha$ channel value.

The image generation module 115 may also integrate the surface reflection data and the data representing the color of the material with image data to which a surface shape for which content on the material is estimated using the surface vector data is applied. That is, this case indicates the case where there are only content data and material data and BRDF/Bidirectional Scattering Surface Reflectance Distribution Function (BSSRDF) on one side is used. In addition, the image generation module 115 may generate the background color by using the actual background color and the material data of the back side. That is, this case indicates the case where there are only content data and material data and BRDF/BSSRDF on both sides is used.

(B) The image generation module 115 generates surface vector data only from data representing a material.

Then, the image generation module 115 integrates surface reflection data, which is obtained by combining data representing a light source with surface vector data, with internal scattering data based on an internal reflection model, which is obtained by combining data representing the color of the material generated in accordance with the background color and the data representing the light source. That is, this case indicates the case where there is no content data and BSSRDF, which is one of light reflection models, is used only for material data.

In addition, the image generation module 115 may integrate surface reflection data, data representing the color of the material, and internal scattering data with image data to which a surface shape for which content on the material is estimated using the surface vector data is applied. That is, this case indicates the case where there are only content data and material data and BRDF/BSSRDF on one side is used. Further, the image generation module 115 may generate the background color by using the actual background color and the material data of the back side. That is, this case indicates the case where there are only content data and material data and BRDF/BSSRDF on both sides is used.

Referring to FIG. 11, an example of a hardware configuration of the image processing apparatus according to the first and second exemplary embodiments will be described. The configuration illustrated in FIG. 11 is implemented by, for example, a personal computer (PC) and is an exemplary hardware configuration including a data scanning unit 1117, such as a scanner, and a data output unit 1118, such as a printer.

A CPU 1101 is a controller that executes a process in accordance with a computer program which describes execution sequences of the various modules described in the exemplary embodiments above, that is, various modules such as the acquisition module 105, the material image generation module 110, the image generation module 115, and the output module 120.

A read-only memory (ROM) 1102 stores a program and calculation parameters used by the CPU 1101, for example. A RAM 1103 stores a program executed by the CPU 1101 and parameters that change accordingly during the execution, for example. The CPU 1101, the ROM 1102, and the RAM 1103 are connected to one another via a host bus 1104, such as a CPU bus.

The host bus 1104 is connected to an external bus 1106, such as a peripheral component interconnect/interface (PIC) bus, via a bridge 1105.

A keyboard 1108 and a pointing device 1109, such as a mouse, are devices operated by an operator. A display 1110, such as a liquid crystal display or a cathode ray tube (CRT) display, displays various kinds of information as text or an image. A touchscreen including functions of both of the pointing device 1109 and the display 1110 may be used. In such a case, the function of the keyboard may be implemented by rendering a keyboard (so-called a software keyboard or screen keyboard) on a screen (touchscreen) with software, instead of physically connecting the keyboard 1108.

An HDD 1111 includes a hard disk (or flash memory or the like) and drives the hard disk to record or reproduce a program executed by the CPU 1101 and information. The hard disk implements functions of the captured image storage module 130 and the background image storage module 135. The hard disk further stores other various kinds of data, various computer programs, etc.

A drive 1112 reads data or a program stored on a removable recording medium 1113 mounted thereto, such as a magnetic disk, an optical disc, a magneto-optical disk, or a semiconductor memory; and provides the data or program to the RAM 1103 connected thereto via an interface 1107, the external bus 1106, the bridge 1105, and the host bus 1104. The removable recording medium 1113 may also be used as a data storage area.

A connection port 1114 is a port to which an external connection device 1115 is to be connected and has a port based on Universal Serial Bus (USB) or Institute of Electrical and Electronics Engineers (IEEE) 1394. The connection port 1114 is connected to the CPU 1101 via the interface 1107, the external bus 1106, the bridge 1105, and the host bus 1104. A communication unit 1116 is connected to a communication network and performs a process to perform data communication with an external apparatus. The data scanning unit 1117, for example, a scanner, performs a document scanning process. The data output unit 1118, for example, a printer, performs a document data output process.

The hardware configuration of the image processing apparatus illustrated in FIG. 11 is merely a configuration example, and the hardware configuration used in the exemplary embodiments is not limited to the configuration illustrated in FIG. 11. The hardware configuration may be any configuration that enables execution of the modules described in the exemplary embodiments. For example, some of the modules may be implemented by dedicated hardware (e.g., an application specific integrated circuit (ASIC)), or may reside on an external system and may be connected to the image processing apparatus via the communication network. Further, plural systems illustrated in FIG. 11 may be connected to one another via the communication network and operate in cooperation with one another. The configuration may be incorporated into a mobile information communication device (such as a mobile phone, a smartphone, a mobile terminal, or a wearable computer), a smart home appliance, a robot, a copier, a fax, a scanner, a printer, or a multifunction peripheral (an image processing apparatus having two or more functions among functions of a scanner, a printer, a copier, and a fax) as well as the PC.

The expressions "greater than or equal to", "less than or equal to", "greater than", and "less than" used in the comparison processing in the description of the above-described exemplary embodiments may be replaced with "greater than", "less than", "greater than or equal to", and "less than or equal to", respectively, as long as contradiction does not occur for the combination thereof.

The described program may be provided after being stored on a recording medium or may be provided via a communication medium. In such a case, for example, the described program may be regarded as the invention related to a "computer readable recording medium storing a program".

The "computer readable recording medium storing a program" is a computer readable recording medium storing a program that is used for installing and executing the program, for distribution of the program, and so forth.

Examples of the recording medium include Digital Versatile Discs (DVDs), such as "DVD-R, DVD-RW, and DVD-RAM" based on standards decided by DVD Forum and "DVD+R and DVD+RW" based on standards decided by DVD+RW; compact Discs (CDs), such as CD-ROM, CD-recordable (CD-R), and CD-rewritable (CD-RW); Blu-ray Discs®; magneto-optical disks (MOs); flexible disks (FDs); magnetic tapes; hard disks; ROMs; electrically erasable programmable ROMs (EEEPROMs®); flash memories; RAMs; and secure digital (SD) memory cards.

The entire program or part of the program may be recorded on the recording media for storage or distribution. Also, the entire program or part of the program may be transmitted by communication using a transmission medium, for example, a wired network, a wireless communication network, or a combination thereof that is used in a local area network (LAN), a metropolitan area network (MAN), a wide area network (WAN), the Internet, an intranet, or an extranet; or may be propagated over carrier waves.

Moreover, the program may be part of or the entirety of another program or may be recorded on a recording medium together with other individual programs. In addition, the program may be divided and portions of the program may be recorded on plural recording media. The program may be recorded in any restorable form, such as a compressed or encrypted form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a first capturing apparatus comprising a first sensor that is configured to capture a first image of a material illuminated from behind by an illuminated source and capturing additional images of the material until the first capturing apparatus determines to end the image capturing process, wherein the material has at least some degree of transparency so that at least some of the light from the illumination source behind the material is allow to go through the material;
   and
   a first generation unit comprising a processor that is configured to generate an image of the material without a background color using the first image and the additional images by generating color conversion coefficients that associate colors of different backgrounds of the first and additional images with corresponding colors of the material on the respective backgrounds and setting a background of the material color coefficients based on the first image and the additional images.

2. The image processing apparatus according to claim 1, further comprising:
a second generation unit that generates an image in which the image of the material generated by the first generation unit is combined with a given background image.

3. The image processing apparatus according to claim 2, wherein the second generation unit uses, as the given background image, an image having a background color but not containing a background or an image having a background color close to black.

4. The image processing apparatus according to claim 2, wherein the second generation unit uses, as the given background image, an image having a background color close to white and generates an image to be displayed on a display device.

5. The image processing apparatus according to claim 2,
wherein light source data is stored in the second generation unit, and
wherein the second generation unit generates an image containing shading created by light source data and the image of the single material without a background color in at least one direction.

6. The image processing apparatus according to claim 3,
wherein light source data is stored in the second generation unit, and
wherein the second generation unit generates an image containing shading created by light source data and the image of the single material without a background color in at least one direction.

7. The image processing apparatus according to claim 4,
wherein light source data is stored in the second generation unit, and
wherein the second generation unit generates an image containing shading created by light source data and the image of the single material without a background color in at least one direction.

8. An image processing apparatus comprising:
a processor that is configured to:
generate a color conversion coefficient representing a relationship between a color of a background and a color obtained in a case where a material is completely superimposed on the background, wherein the material has at least some degree of transparency; and
apply the color conversion coefficient to color data of a first image and generates color data of the material on the background, thereby generating a second image by applying the color conversion coefficient to the first image.

9. The image processing apparatus according to claim 8, wherein the processor applies the color conversion coefficient to statistical data of the first image and generates statistical data of the color data of the material on the background.

* * * * *